UNITED STATES PATENT OFFICE.

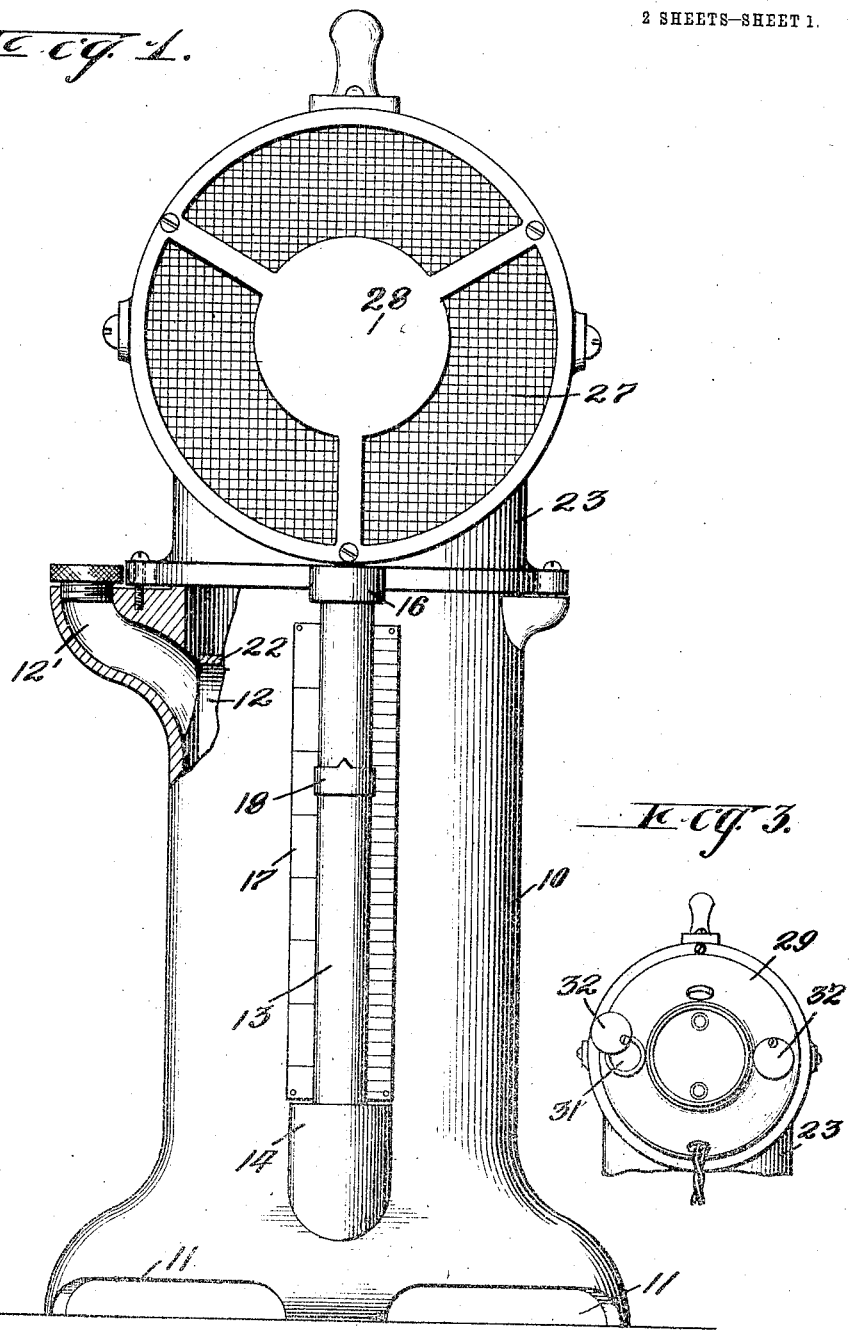

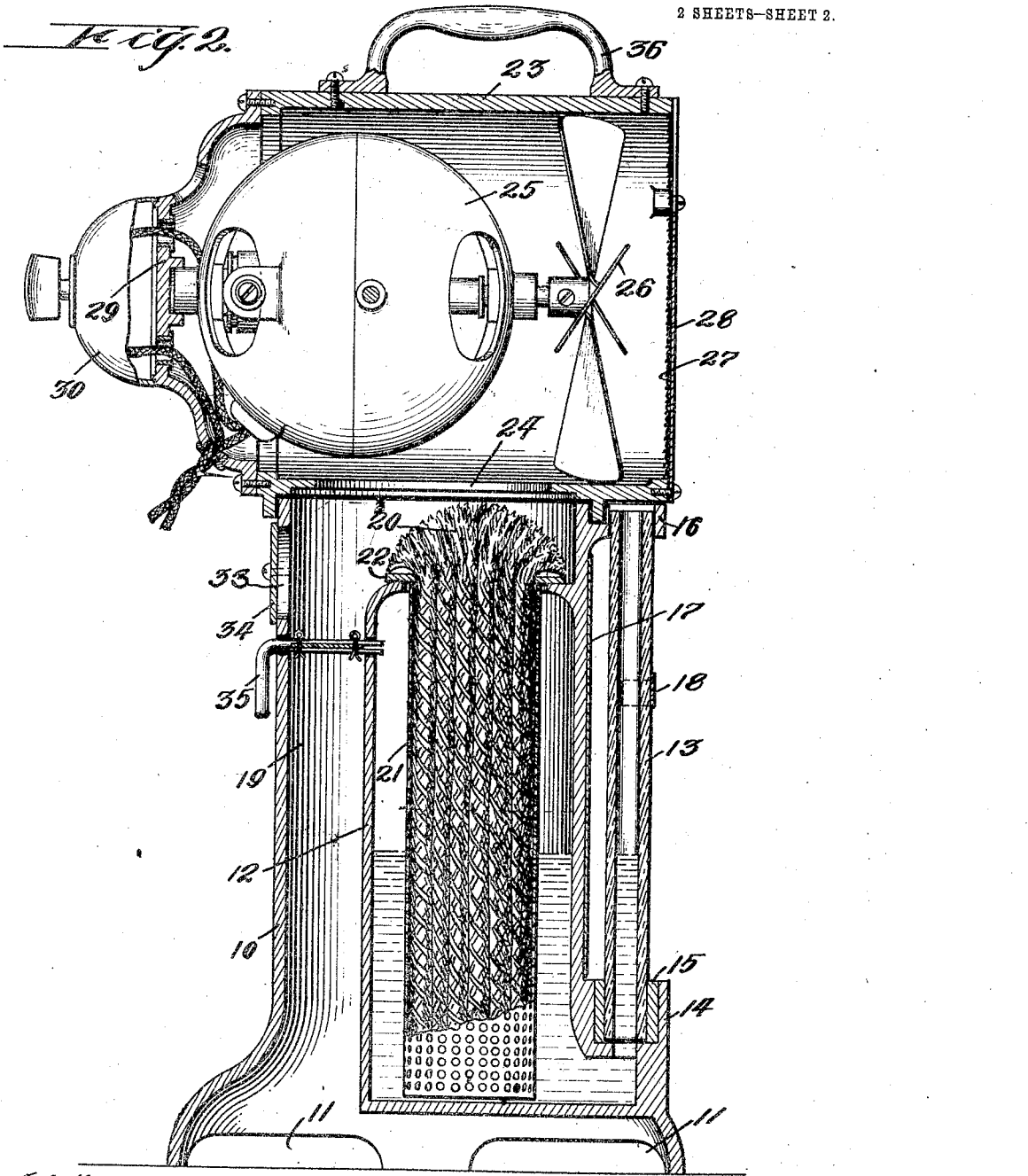

CLARKE S. DRAKE, OF MILWAUKEE, WISCONSIN.

HUMIDIFIER.

1,079,935.  Specification of Letters Patent.  Patented Dec. 2, 1913.

Application filed July 28, 1911. Serial No. 640,989.

*To all whom it may concern:*

Be it known that I, CLARKE S. DRAKE, a citizen of the United States, and resident of Milwaukee, in the county of Milwaukee and State of Wisconsin, have invented new and useful Improvements in Humidifiers, of which the following is a description, reference being had to the accompanying drawings, which are a part of this specification.

This invention relates to humidifiers for charging the atmosphere with moisture for any purpose, as for moistening the air in cigar cases and vaults, for distributing disinfectants or perfume through auditoriums or hospitals and for like purposes and has for its object to provide mechanism for forcibly drawing air through a chamber provided with means for keeping it constantly supplied with the desired liquid exposed to the passing air for charging and then ejecting it into the atmosphere.

Another object of the invention is to provide such a humidifier with an indicator showing the level of the liquid within the receptacle, whereby the rate of consumption of the liquid may be readily determined.

Another object of the invention is to perfect details of construction of such a device, whereby it may be made neat in its appearance and compact and portable so as to be located where desired.

With the above and other objects in view the invention consists in the humidifier as herein claimed, its parts and combinations of parts and all equivalents.

Referring to the accompanying drawings in which like characters of reference indicate the same parts in the several views: Figure 1 is a front elevation of a humidifier constructed in accordance with this invention, a portion being broken away to show the feed opening for supplying liquid thereto. Fig. 2 is a central vertical sectional view thereof; and, Fig. 3 is a rear elevation of the upper portion thereof.

In these drawings 10 indicates a base, as herein shown, formed of a casting of substantially cylindrical shape with an enlarged lower end on which it rests provided with openings 11 for the admission of air to the interior thereof. The base is hollow except for a liquid receptacle 12 which may be formed integral with the base casting as shown, or it may be separate therefrom, but it is preferably so constructed that it may be filled through a capped opening 12′ at one side and that a glass gage tube 13 outside of the base is in communication therewith so that the liquid level in the receptacle will appear in the gage tube. As herein shown, the base casting is provided with a boss 14 communicating with the liquid receptacle and in which the gage tube 13 fits with a cork or other gasket 15 therebetween to form a liquid tight joint, the upper end of the gage tube being retained in place by a ring 16 of the base. A graduated scale 17 may be placed back of the gage tube for convenience in comparing the readings, and an indicator 18 in the form of a spring slide is desirably mounted on the gage tube to slide thereon so that the level of the liquid at the beginning of the operation may be recorded by moving said indicator on the gage tube until it registers with the level of the liquid. Then at the end of the operation the distance between the indicator and the level of the liquid will represent the extent to which the liquid has been dispelled into the atmosphere.

Any convenient means may be provided for conveying the liquid from the liquid receptacle into an air passage 19 through the base which is provided by reason of the liquid receptacle being smaller than the interior of the base casting, but as here shown, such means comprises a wick 20 which is contained within a perforated metal casing 21 which is let down into the liquid receptacle 12 through an opening in the upper end thereof, said wick extending from near the bottom of the liquid receptacle, through the removable cover 22 for the opening in the top of the receptacle, to the air passage 19.

On top of the base 10 is mounted a casing 23 which is approximately of cylindrical shape with its interior communicating with the air passage 19 through an opening 24 in its bottom, and contained within this casing 23 is an electric motor 25 bearing a fan 26 which serves to draw the air through the air passage 19 and discharge it through the open end of the casing which is covered by a wire screen 27 and a disk shaped baffle plate 28. The baffle plate serves to break up the direct current of air from the fan and cause the air to be discharged slowly through the surrounding space. At the back of the casing 23 is a removable cap 29 which assists in the support of the motor and which bears a snap switch 30 for controlling the motor, such cap being also provided with opening 31 for admitting more or less air direct to the fan when it is desired to modify the action of the device by requiring less air to pass through the air passage 19 to supply the fan. These openings 31 are controlled by adjustable covers 32 for varying the admission of air therethrough to the desired extent. The base casting 10 is also provided with an opening 33, but this opening is at or below the level of the end of the wick 20 so that air drawn therethrough will pass the wick and become charged with the liquid. The opening 33 is provided with an adjustable cover 34 for varying the effect thereof, while a butterfly valve 35 positioned across the air passage 19 serves to control the flow of air admitted from beneath the stand.

The device may be provided with a handle 36 for carrying it from place to place and its motor may be connected by an attachment plug with a lamp socket wherever it is desired to be operated.

In operation the fan serves to draw air through the air passage 19 or more directly through the opening 33, as preferred, and this air in passing over the moistened end of the wick 20 evaporates the liquid therefrom and charged with the liquid vapor it is ejected through the screen end of the casing into the atmosphere, thus rapidly charging the atmosphere with the vapor of the liquid contained in the liquid receptacle. The extent to which the air is charged with the vapor is varied by the manipulation of valves 35, 34 and 32 and the rate of consumption of the liquid may be determined by inspecting the gage tube.

The device being portable and adapted for connection to lamp sockets it may be readily changed from place to place and thus become effective for thoroughly atomizing or disinfecting large rooms or buildings as well as being adapted for use in humidifying smaller spaces, such as cigar cases and vaults.

The term "humidifier" as employed herein is intended to include such devices as fumigators and the like wherein disinfectants or other materials are diffused through the air by means of a liquid used as a vehicle therefor.

While an electric motor is specifically mentioned as the most convenient type for operating the device, it will be understood that the invention may be operated by any suitable form of motor.

The operation of the baffle plate 28 is to prevent or offer resistance to the return air currents produced by the fan blades and tending to flow into the center of the fan. These return air currents reduce the draft through the air passage or the openings 31 produced by the fan and would therefore impair the operation of the device. This plate 28 and the screen 27 also serve as a fan guard.

What I claim as new and desire to secure by Letters Patent, is:

1. In a device of the character described, a casing, provided with an opening for the admission of air and an outlet opening for the air, an air moistener within the casing, means located between the moistener and the outlet for sucking in air through the opening past the moistener and discharging it from the casing, the casing being provided with a second opening for admitting air between the moistener and the suction side of the air sucking means.

2. In a device of the character described, a hollow base forming an air passage, openings in the bottom of the base leading to the air passage, a liquid receptacle contained within the base, a wick in the liquid receptacle for conveying the liquid therefrom to the air passage, a casing mounted on the base and having an open end, and an electric fan located therein and drawing air from the air passage and discharging it through the open end of the casing, there being an opening in the casing opposite the fan.

In testimony whereof, I affix my signature, in presence of two witnesses.

CLARKE S. DRAKE.

Witnesses:
R. S. C. CALDWELL,
KATHERINE HOLT.